Figure 1:
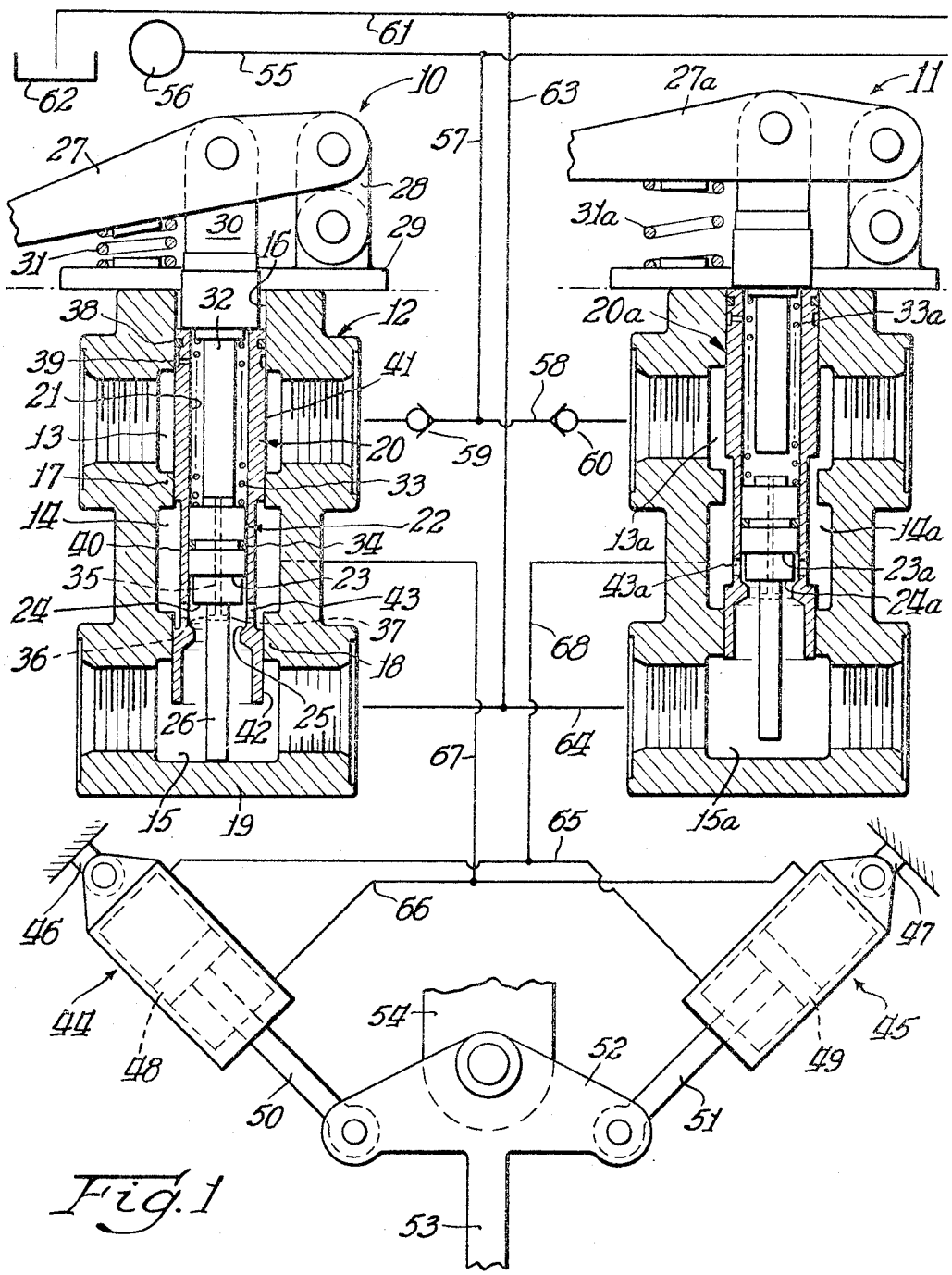

Sept. 6, 1966 W. T. STEPHENS 3,270,622
CONTROL VALVE FOR SWINGING A BOOM
Filed March 23, 1964 2 Sheets-Sheet 1

Inventor:
William T. Stephens
By: F. A. Krusemark Atty.

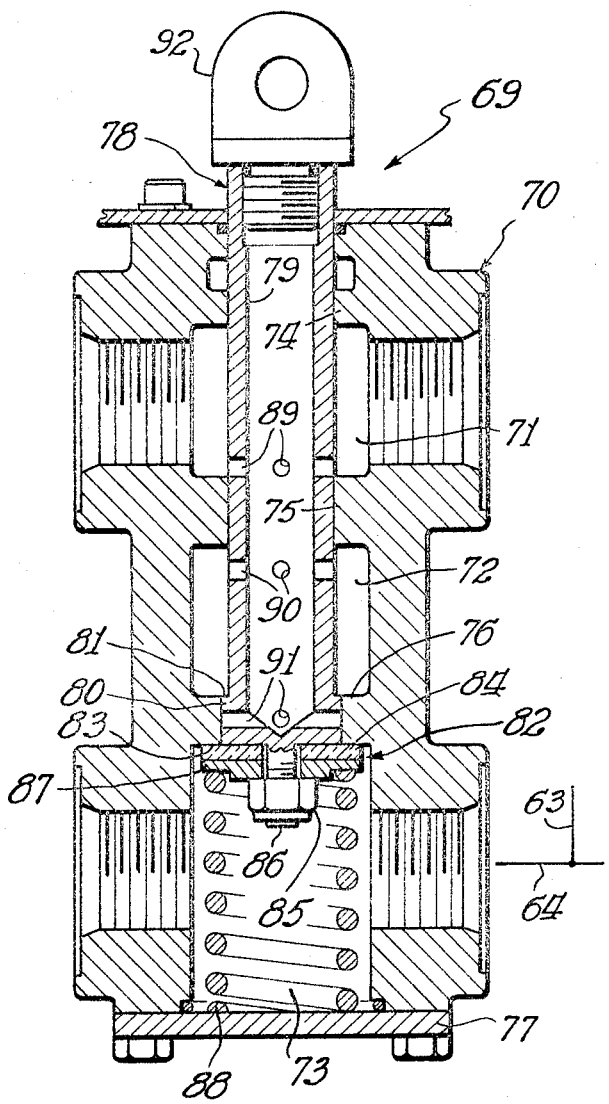

United States Patent Office 3,270,622
Patented Sept. 6, 1966

3,270,622
CONTROL VALVE FOR SWINGING A BOOM
William T. Stephens, Auburn, Ind., assignor to Borg-Warner Corporation, a corporation of Illinois
Filed Mar. 23, 1964, Ser. No. 353,735
8 Claims. (Cl. 91—186)

This invention relates particularly to a closed center system for the swing operation of a work member in a hydraulic mechanism especially applicable with respect to a backhoe and more particularly to valve control means for such purpose.

In the swing operation of currently available backhoes the momentum of a boom and bucket, right to left, creates a momentary shock load tending to upset the vehicle if the mass is stopped suddenly because of the time factor in the opening of the relief valve.

In the present invention the momentary shock referred to above is eliminated for the reason that a combination outmetering and relief valve is provided in the control valve in such a manner, so that when the swing operation is initiated, the relief valve is opened manually therefore in the event the swing operation were suddenly stopped, there could be no momentary shock because the relief valve is already open.

It is therefore an important object of the present invention to provide an improved control valve for the swing operation of a work member in a hydraulic mechanism which eliminates shock with respect to the swing operation of the work member.

It is another important object of the present invention to provide an improved control valve with respect to the swing operation of a work member in a hydraulic mechanism which incorporates a relief valve therein which is manually operable.

The invention consists of the novel constructions, arrangements and devices to be hereinafter described and claimed for carrying out the above stated objects and such other objects as will be apparent from the following description of a preferred form of the invention, illustrated with reference to the drawings, wherein:

FIGURE 1 is a schematic view of the fluid circuity interconnecting the cylinders of a backhoe or similar mechanism with a pair of control valves shown in cross section, according to the present invention; and FIGURE 2 is an alternate form of the control valves shown in FIGURE 1.

Referring now to FIGURE 1, a pair of control valves 10 and 11 are shown. The control valve 10 comprises a housing 12 having therein annular fluid chambers 13, 14, and 15 respectively. The annular fluid chambers 13, 14, and 15 in the housing 12 being defined by lands 16 and 17, by the land 17 and a land 18, and the land 18 and an end wall 19, respectively.

A spool 20 provided with a cylindrical bore 21 therethrough, has an inner spool 22 operable therein that is provided with a reduced diameter at its lower end thereby providing an annular reaction surface 23 and a valve head 24 operably associated with a valve seat 25 in the lower end of the cylindrical bore 21. A projection 26 depends from the valve head 24.

A lever 27 operably associated with the spools 20 and 22 is hinged to a support 28 connected to a base plate 29 which is fixed to the top end of the housing 12. The lever 27 is pivotally connected to a shaft 30 fixed to the upper end of the spool 20 which closes the upper end of the cylindrical bore 21. A compression spring 31 is interposed between the lever 27 and its base plate 29. An extension 32, comprising a reduced diameter of the shaft 31, extends into the cylindrical bore 21 and is engagable with the upper end of the inner spool 22. A compression spring 33 is biased between the spool 22 and the shaft 30.

The inner spool 22 is provided with a fluid sealing means 34, such as an O-ring, and a longitudinal fluid passage 35 which extends downwardly from its upper face into the projection 26 and is in fluid communication with the lower end of the cylindrical bore 21 by means of ports 36 and 37 thereby permitting fluid to fill the void above the inner spool 22.

The spool 20 is provided with a fluid sealing means 38 such as an O-ring, a port 39, and a wide annular groove 40 which thereby provided spool lands 41 and 42 on opposite sides thereof. A port 43 is provided in the area of the wide annular groove 40 which is operably in fluid communication with the annular fluid chambers 13, 14, and 15.

In further explanation regarding the spools 20 and 22 it should be noted that they comprise a combination of outmetering and check valve.

When the control valve 10 is in neutral position, the annular reaction surface 23 of the inner spool 22 is exposed to pressure by way of port 43, as hereinafter shown, which, if it exceeds the value of the spring 33, the valve head 24 is unseated thereby functioning as a relief valve.

When the lever 27 is depressed the spools 20 and 22 move in unison until the projection 26 is stopped by the end wall 19; further depression of the lever 27 causes the spool 20 to move with respect to the inner spool 22 which unseats the valve head 24 thereby metering fluid through the port 43 in the swing operation, as hereinafter more fully explained, thereby serving the purpose of an outmetering valve.

The control valve 11 has comparable components to those innumerated with respect to control valve 10 which bear like numbers but identified as components of the control valve 11 by the addition of the letter *a*.

A pair of cylinders 44 and 45 are swingably connected to base supports 46 and 47, respectively, and have reciprocally operably therein pistons 48 and 49, respectively, which are provided with piston rods 50 and 51, respectively, that are pivotally connected at opposite ends of an arm 52 which is an integral part of a boom 53. The arm 52 is swingably connected at its medial area to a base support 54.

A pressure fluid conduit 55 is constantly pressurized by a pressure compensated piston pump 56 to which it is connected. A fluid conduit 57 interconnects the fluid conduit 55 with a conduit 58 which is connected to, and in fluid communication with the annular chamber 13 of the control valve 10 at one end thereof, and at the other end thereof is connected to the control valve 11. A pair of check valves 59 and 60, which inhibit the return flow of fluid from the annular chambers 13 and 13*a* respectively, are provided in the fluid conduit 58 thereby maintaining pressure in the annular chambers 13 and 13*a*.

A return fluid conduit 61, connected to a fluid reservoir 62, is in fluid communication with a fluid conduit 63 connected to a fluid conduit 64 which interconnects the annular fluid chambers 15 of the control valve 10 and the annular chamber 15*a* of the control valve 11.

A fluid conduit 65 interconnects the piston side of the cylinder 46 and the rod side of the cylinder 47, and a fluid conduit 66 interconnects the rod side of the cylinder 46 and the piston side of the cylinder 47. Fluid conduits 67 and 68 interconnect the annular chamber 14 with the fluid conduit 66 and the annular chamber 14*a* with the fluid conduit 67, respectively.

Referring now to FIGURE 2 another form of the control valve is shown identified by the numeral 69 which comprises a housing 70 having annular chambers 71, and 72, and cylindrical chamber 73 therein. The annular chambers 71, 72, and the cylindrical chamber 73 being defined by lands 74 and 75, by the land 75 and a land 76, and the land 76 and end wall 77, respectively.

A spool 78 provided with a cylindrical bore 79 is reciprocally operable in the said housing 70 and in fluid sealing engagement with the said lands. The lower end of the spool 78 is provided with an enlarged diameter 80 operably associated with the said land 76 thereby providing a reaction surface 81. A valve head 82 is operably associated with a valve seat 83 which comprises the lower face of the land 76. The valve head 82 comprises a washer 84 preferably of plastic held in place by a nut 85 threaded on a protrusion 86 extending axially from the enlarged diameter 80. A second washer 87 is provided between the washer 84 and the nut 85. A spring 88 is interposed between the end wall 77 and the valve head 82 urging it into engagement with the valve seat 83. The spool 78 is provided with ports 89 and 90 which in the norm position of the spool 78 are on opposite sides of the land 75 and ports 91 which with the spool 78 in its norm position are sealed against the face of the land 76. A cap 92 is fastened to the upper end of the spool 78 in sealing engagement and with respect to the cylindrical bore 79. Cap 92 also serves as a means for attaching a lever or other suitable means not shown for the manual operation of the spool 78.

In operation when the boom is stationary, the pressure compensated piston pump 56 constantly pressurizes the annular chambers 13 and 14, and 13a and 14a of control valves 10 and 11, respectively. This pressure, of course, is exerted against the annular reaction surfaces 23 and 23a by way of ports 43 and 43a, respectively. Should the pressure against these reaction surfaces exceed the value of the compression springs 33 and 33a respectively, the valve heads 24 and 24a would be unseated thereby serving as relief valves.

Because of this constant pressurizing the pistons 48 and 49 are pressure locked by virtue of fluid communication with the annular chambers 13 and 13a. The rod side of the cylinder 44 and the piston side of cylinder 45 being in fluid communication with the annular chamber 13; and the piston side of the cylinder 44 and the rod side of the cylinder 45 being in fluid communication with the annular chamber 13a.

The path of the fluid flow from the annular chamber 13 to the rod side and the piston side of the cylinders 44 and 45 respectively is by way of the annular chamber 14 and the fluid conduits 67 and 66.

The path of flow from the annular chamber 13a to the piston side and the rod side of the cylinders 44 and 45 respectively is by way of the annular chamber 14a and the fluid conduits 68 and 65.

It should be noted, that at this time, the lever 27 of control valve 10 is not depressed but is in the neutral position as shown in control valve 11.

In starting the swing operation, and it is desired to swing the boom 53 to the left, the lever 27 is depressed which moves the spool 20 downwardly and closes the gap between the extension 32 and the top of the inner spool 22, after which the spool 20 and 22 move in unison until the projection 26 contacts the end wall 19. This position with respect to the control valve 10 is shown in the drawing.

Thus after the movement of the inner spool 22 has been stopped as shown above, further movement of the spool 20 unseats the valve head 24 from the valve seat 25 which provides intercommunication between the annular chambers 14 and 15 by way of port 43 which thereby permit the draining of the fluid from the rod side and the piston side of the cylinders 44 and 45 respectively; the fluid returning by way of fluid conduits 66 and 67, thence, through the annular chamber 14, the port 43, the annular chamber 15, the fluid conduits 64, 63 and 61, into the fluid reservoir 62.

During this return fluid movement the annular chamber 13a, which is being constantly pressurized as heretofore stated, provided fluid under pressure to the piston side and the rod side of the cylinders 44 and 45 respectively which causes the piston 48 to exert pressure against one end of the arm 52, and the piston 49 to exert a pulling force at the other end of the arm 52 thereby causing the boom 53 to swing to the left.

The flow path of the fluid under pressure from the annular chamber 13a is by way of annular chamber 14a and the conduits 68 and 65 as is apparent from the drawings.

When it is desired to swing the boom 53 to the right, the lever 27a is depressed and the same sequence of events occur as those developed with respect to the control valve 10 but in reverse order.

Referring now to the alternative control valve 69, the construction is somewhat different from that shown in FIGURE 1. The functioning however is generally similar.

The reaction surface 81 provides means whereby the spool 78 serves as a relief valve; it being apparent from the drawing that on the buildup of pressure in the annular chambers 72 in excess of the value of the spring 88, the valve head 82 is unseated and fluid from the annular chamber 72 will pass therefrom through the ports 90 and 91, into the cylindrical chamber 73 and thence to the fluid reservoir 62 by way of fluid conduits 64, 63, and 61.

It is also apparent from the drawing that when the control valve 69 is put into operational use for swinging the boom; depressing the spool 78 unseats the valve head 82 and expose the ports 91 to the cylindrical chamber 73 whereby the same sequence of events occur as shown with respect to the operation of the spool valve 10 or 11 in the swing operation.

While this invention has been described in connection with certain specific embodiments thereof, it is to be understood that is by way of illustration and not by way of limitation and the scope of this invention is defined solely by the appended claims which should be construed as broadly as the prior art will permit.

I claim:

1. A hydraulic mechanism provided with a source of constant fluid pressure and a sump for the operation of a work member, the combination of:
   (a) a first control valve, comprising a housing having first, second and third fluid chambers therein, said first and second fluid chambers normally being in fluid communication with each other and port means operably communicable between said second and third fluid chambers; a combination outmetering and relief valve operable in said housing comprising: a spool valve adapted to provide a valve head at its lower end, a valve seat operably associated with said valve head, a spring urging said valve head into engagement with said valve seat, a reaction surface at the lower end of said spool valve serving as a means for unseating said valve head when the pressure buildup exceeds the predetermined value of said spring,
   (b) a second control valve having the same components as said first control valve,
   (c) first and second cylinders provided with first and second pistons, respectively, operably connected with respect to said work member,
   (d) a first fluid conduit interconnecting the piston side and the rod side of the said first and second cylinders respectively,
   (e) a second fluid conduit interconnecting the rod side and the piston side of the said first and second cylinders respectively,
   (f) a third fluid conduit interconnecting said third annular chambers of the said first and second control valves,
   (g) a fourth fluid conduit interconnecting said first fluid chambers of the said first and second control valves, (h) a pair of check valves in said fourth fluid conduit one each for each of said first fluid chambers, (i) a fifth fluid conduit interconnecting the said source of constant fluid pressure and the said fourth fluid conduit, (j) a sixth fluid conduit interconnecting the said sump and the said third fluid conduit, (k) a seventh fluid conduit interconnecting said second fluid chamber of the said second control valve and the said first fluid conduit, (l) an eighth fluid conduit interconnecting said second fluid chamber of the said first control valve and the said second fluid conduit, (m) a manual means pivotally connected with respect to said first control valve for reciprocal operation of said combination outmetering and relief valve therein, whereby when said manual means is depressed to a certain degree the said valve head is unseated and fluid communication between said first and second annular chambers of the said first control valve is closed and fluid communication is established between the said second and third fluid chambers of the said first control valve, and fluid by way of said second fluid conduit is free to drain from the rod side and the piston side of the said first and second cylinders, respectively, by way of: the said eighth fluid conduit, the said second and third annular chambers of the said first control valve by means of the said port, and thence by way of the said third and sixth fluid conduits into the said sump whereby the said source of constant fluid pressure is exerted at the piston side and the rod side of the said first and second cylinders, respectively, which thereby causes said work member to swing in one direction; the flow of fluid from the said source of constant fluid pressure being by way of the said fifth and fourth fluid conduits, the said first and second fluid chambers of the said second control valve, and the said eighth and first fluid conduits; and (n) a manual means pivotally connected with respect to said second control valve for reciprocal operation of the said combination outmetering and relief valve therein whereby when said manual means of said second control valve is depressed to a certain degree, the same sequence of events occur as those with respect to the operation of the said first control valve, except in reverse thereof, whereby the said work member is caused to swing in the other direction.

2. A hydraulic mechanism according to claim 1 wherein the said spool valve comprises an inner and outer spool.

3. In a closed center hydraulic mechanism for the operation of a work operably connected each provided with a piston, with respect to first and second cylinders comprising:

(a) a sump and a source of constant fluid pressure conneced to first and second control valves each having first, second and third fluid chambers, said first fluid chambers being interconnected by a first fluid passage means which is connected to said source of fluid pressure whereby the pistons of the said first and second cylinders are locked, (b) a second fluid passage means interconnecting said second fluid chamber of said first control valve with the rod side of the piston side of said first and second cylinders, respectively, (c) a third fluid passage means interconnecting said piston side and said rod side of said first and second cylinders, respectively, (d) a first and second combination outmetering and relief valve in said first and second control valves, (e) a first lever associated with said first control valve pivotally connected with respect to said first outmetering and relief valve whereby when said first lever is depressed to a certain degree the relief valve feature of the said first combination outmetering and relief valve is opened and communication is established between the said sump and the said piston and rod sides of said first and second cylinders, respectively, thereby providing pressure on the rod side and the piston side of the said first and second cylinders, respectively, whereby the outmetering valve feature of the said first combination outmetering and relief valve may be manipulated by means of said first lever to control the swing movement of the said work member in one direction; and (f) a second lever associated with said second control valve swingably connected to said second outmetering and relief valve whereby when the said lever is depressed to a certain degree the same sequence of events occur as those with respect to the operation of said first control valve, except in reverse thereof, whereby the manipulation of said second lever controls the swing movement of said work member in the opposite direction.

4. A control valve for a hydraulic mechanism for the swing operation of a work member comprising in combination:

(a) a housing having first, second, and third fluid chambers therein communicable with said hydraulic mechanism the said first and second fluid chambers normally being in fluid communication with each other, (b) a combination outmetering and relief spool valve operable in said housing,
  (1) a valve head at the lower end of said spool valve,
  (2) a valve seat operably associated with said valve head,
  (3) a spring urging said valve head into engagement with said valve seat and,
  (4) a reaction surface at the lower end of said spool valve serving as a means for unseating said valve head when the pressure buildup exceeds the value of said spring, and, (c) manual means for reciprocal movement of said combination outmetering and relief spool valve.

5. A control valve for a hydraulic mechanism for the swing operation of a work member comprising in combination:

(a) a housing having first, second, and third fluid chambers therein communicable with said hydraulic mechanism, the said first and second fluid chambers normally being in fluid communication with each other, (b) a combination outmetering and relief valve operable in said housing comprising,
  (1) a spool having a cylindrical bore therethrough,
  (2) an inner spool adapted to provide a valve head at its lower end operable in said cylindrical bore,
  (3) a valve seat in the lower end of said cylindrical bore,
  (4) a spring urging said valve head into engagement with said valve seat,
  (5) a reaction surface at the lower end of said inner spool serving as a means for unseating said valve head when the pressure buildup exceeds the value of said spring and,
  (6) a means depending from said inner spool for limiting the downward movement thereof, and (c) manual means for reciprocal movement of said combination outmetering and relief valve.

6. A control valve for a hydraulic mechanism for the swing operation of a work member comprising in combination:

(a) a housing having first, second and third fluid chambers therein, the said first and second fluid chambers normally being in fluid communication with each other,
(b) a combination outmetering and relief spool valve having a bore therein operable in said housing,
 (1) a valve head at the lower end of said spool valve,
 (2) a valve seat in said housing between said second and third fluid chambers operably associated with said valve head,
 (3) a spring urging said valve head into engagement with said valve seat and,
 (4) a reaction surface at the lower end of said spool valve serving as a means for unseating said valve head when the pressure buildup exceeds the value of said spring, and,
(c) manual means for reciprocal movement of said combination outmetering and relief spool valve.

7. A control valve according to claim 6 wherein the said housing is provided with first, second and third lands and wherein the said spool is provided with first, second and third ports, said first and second ports establishing fluid communication between said first and second fluid chambers when said spool valve is in its retracted position and said third ports establishing fluid communication between said second and third fluid chambers when said spool value is depressed to a degree such that said third ports are exposed to said third fluid chamber.

8. A control valve for a hydraulic mechanism for the swing operation of a work member comprising in combination:
(a) a housing having first, second and third fluid chambers therein communicable with said hydraulic mechanism, the first and second fluid chambers normally being in fluid communication with each other,
(b) a spool valve having a cylindrical bore therein operable in said housing,
(c) first and second lands separating said first and second fluid chambers and said second and third fluid chambers respectively,
(d) a valve head at the lower end of said spool valve operably associated with a valve seat consisting of the lower surface area of said second land,
(e) a spring urging said valve head in seating engagement with said valve seat,
(f) a reaction surface at the lower end of said spool valve whereby when said fluid pressure buildup exceeds the predetermined value of said spring said valve head is unseated,
(g) first ports normally in fluid communication between said cylindrical bore and said first fluid chamber,
(h) second ports normally in fluid communication between said cylindrical bore and said second fluid chamber.
(i) third ports in fluid communication with said cylindrical bore and normally sealed against fluid loss by the inner periphery of said second land, and
(j) means for reciprocal movement of said spool valve.

References Cited by the Examiner

UNITED STATES PATENTS

| | | | |
|---|---|---|---|
| 1,467,982 | 9/1923 | Johnson | 91—186 |
| 2,015,705 | 10/1935 | Bragg | 91—186 |
| 2,464,283 | 3/1949 | Adams | 91—421 |
| 2,619,118 | 11/1952 | Adams | 137—625.68 |
| 3,136,328 | 6/1964 | Hipp | 137—596.13 |

MARTIN P. SCHWADRON, *Primary Examiner.*

SAMUEL LEVINE, *Examiner.*

P. E. MASLOUSKY, *Assistant Examiner.*